(12) United States Patent
Hoque Chowdhury et al.

(10) Patent No.: US 10,562,824 B2
(45) Date of Patent: Feb. 18, 2020

(54) INK-JET PRINTING ON FIBER CEMENT PRODUCTS

(71) Applicant: Eternit GmbH, Heidelberg (DE)

(72) Inventors: Raphael Hoque Chowdhury, Leimen (DE); Nicolas Lüders, Karlsruhe (DE); Gerhard Schmidt, Bad Schönborn (DE)

(73) Assignee: Eternit GmbH, Heidelberg (DE)

( * ) Notice: Subject to any disclaimer, the term of this patent is extended or adjusted under 35 U.S.C. 154(b) by 0 days.

(21) Appl. No.: 15/556,496

(22) PCT Filed: Mar. 7, 2016

(86) PCT No.: PCT/EP2016/054814
§ 371 (c)(1),
(2) Date: Sep. 7, 2017

(87) PCT Pub. No.: WO2016/146423
PCT Pub. Date: Sep. 22, 2016

(65) Prior Publication Data
US 2018/0037514 A1    Feb. 8, 2018

(30) Foreign Application Priority Data
Mar. 13, 2015    (EP) ..................................... 15159046

(51) Int. Cl.
*C04B 41/00* (2006.01)
*C04B 41/48* (2006.01)
(Continued)

(52) U.S. Cl.
CPC ........... *C04B 41/009* (2013.01); *B41M 5/007* (2013.01); *B41M 5/0047* (2013.01);
(Continued)

(58) Field of Classification Search
CPC ..... C09D 11/30; B41M 5/502; B41M 5/5218; B41M 7/0045
See application file for complete search history.

(56) References Cited

U.S. PATENT DOCUMENTS

| | | | |
|---|---|---|---|
| 2002/0044186 A1* | 4/2002 | Tochihara ............ | B41M 5/5218 347/100 |
| 2008/0192102 A1* | 8/2008 | Leenders ................. | B41M 3/14 347/102 |

(Continued)

FOREIGN PATENT DOCUMENTS

| | | |
|---|---|---|
| EP | 1 914 215 A1 | 4/2008 |
| EP | 2 962 845 A1 | 1/2016 |
| JP | 2008-273055 A | 11/2008 |
| JP | 2010-194462 A | 9/2010 |
| JP | 2014-166698 A | 9/2014 |

(Continued)

*Primary Examiner* — Betelhem Shewareged
(74) *Attorney, Agent, or Firm* — Dilworth & Barrese, LLP

(57) ABSTRACT

The present invention relates to processes for producing fiber cement products as well as to the fiber cement products obtainable therewith. More specifically, the present invention relates to fiber cement products that are suitable for being subjected to ink-jet printing, which fiber cement products at least comprise on their outer surface one or more cured layers of a first coating composition, which at least comprises a binder and a pigment and which is characterized by a pigment volume concentration of higher than about 40%. The invention further provides processes for producing such fiber cement products. Moreover, the present invention provides processes for producing ink-jet printed fiber cement products and ink jet printed fiber cement products obtainable therewith. The present invention further relates to various uses of these fiber cement products, in particular as building materials.

17 Claims, 2 Drawing Sheets

(51) Int. Cl.
    *C04B 41/71*   (2006.01)
    *B41M 5/00*    (2006.01)
    *B41M 5/52*    (2006.01)
    *B41M 5/50*    (2006.01)
    *B41M 7/00*    (2006.01)
    *C09D 11/30*   (2014.01)

(52) U.S. Cl.
    CPC .......... *B41M 5/502* (2013.01); *B41M 5/5218* (2013.01); *B41M 5/5254* (2013.01); *B41M 7/0045* (2013.01); *C04B 41/0045* (2013.01); *C04B 41/483* (2013.01); *C04B 41/71* (2013.01); *C09D 11/30* (2013.01)

(56) References Cited

U.S. PATENT DOCUMENTS

| | | |
|---|---|---|
| 2009/0005494 A1 | 1/2009 | Luo et al. |
| 2012/0251787 A1 | 10/2012 | Mizuno |
| 2014/0349106 A1 | 11/2014 | Chen et al. |
| 2015/0368489 A1* | 12/2015 | Satou .................... B41M 5/502 428/143 |

FOREIGN PATENT DOCUMENTS

| | | |
|---|---|---|
| JP | 5-597296 B1 | 10/2014 |
| WO | 2013/138566 A1 | 9/2013 |
| WO | 2014/132295 A1 | 9/2014 |

* cited by examiner

Pigment Volume Concentration (PVC) (%)

INK-JET PRINTING ON FIBER CEMENT PRODUCTS

FIELD OF THE INVENTION

The present invention relates to processes for producing fiber cement products as well as to the fiber cement products obtainable therewith. More specifically, the present invention relates to fiber cement products that are suitable for being subjected to ink-jet printing as well as to processes for producing such fiber cement products. Moreover, the present invention provides processes for producing ink-jet printed fiber cement products and ink-jet printed fiber cement products obtainable therewith. The present invention further relates to various uses of these fiber cement products, in particular as building materials.

BACKGROUND OF THE INVENTION

Fiber cement products are well known and widely used as building materials. In order to protect these materials from potential transport and installation damages as well as defects due to weathering and humidity, one or more coating layers are often applied on the outer surface during production. In addition, colored coatings were developed to provide fiber cement products with an esthetically desired look at the outer surface.

However, it would further be desirable to produce fiber cement products provided with a decorative design pattern, an advertising pattern and/or an identification print on the outer surface.

Ink-jet printing with traditional solvent-based or water-based pigmented inks is a known method for directly patterning and fabricating patterns without the need for masks. While this process has been widely used for producing decorative and advertising patterns directly onto on objects such as ceramics and glass, this was up to now not possible with fiber cement products because of the inherent heterogenic composition and surface roughness of fiber cement. Indeed, ink-jet printing performed directly onto the surface of a fiber cement object with traditional solvent-based or water-based pigmented inks resulted up to now in ink bleeding and thereby substantially reduced the print quality by causing jagged edges and even undesirable ink stains.

SUMMARY OF THE INVENTION

An object of the present invention is to provide improved fiber cement products, as well as processes for the production thereof, which products are suitable for being subjected to ink-jet printing with traditional solvent-based or water-based pigmented inks, i.e. without resulting in the above described undesirable consequences of ink spreading throughout the fiber cement structure.

In this regard, the present inventors have developed novel and improved fiber cement products that can be ink-jet printed with high efficiency and performance.

In particular, it was found that by providing fiber cement products with at least one coating layer, comprising a binder and a pigment, which layer is characterized by a pigment volume concentration (PVC) of higher than about 40%, ink-jet printing can be performed without encountering any of the above-stated issues. The inventors have found that this is due to the fact that the coating layer as described in the present invention has an improved (i.e. increased) porosity for ink-jet ink compositions in comparison with the outer surface of known coated and uncoated fiber cement products. By being able to absorb and capture the ink composition relatively quickly after ink-jetting, the coating layer of the products of the invention prevents this ink composition from spreading out over the surface of the fiber cement product. The inventors have found that this effect is particularly observed when making use of prime pigments (as defined herein), such as for example $TiO_2$, wherein these prime pigments are present in an effective pigment volume concentration (as defined herein) of at least about 40%.

In a first aspect, the present invention provides fiber cement products suitable for being subjected to inkjet-printing, which fiber cement products at least comprise on at least part of their outer surface one or more cured layers of a first coating composition, which composition at least comprises a binder and a pigment and is characterized by a pigment volume concentration (PVC) of at least about 40%, particularly between about 40% and about 80%, such as between about 40% and about 70%, more particularly between about 40% and about 60%. In further particular embodiments, the first coating composition of the fiber cement products suitable for being subjected to inkjet-printing is characterized by a pigment volume concentration of at least about 50%, more particularly between about 50% and about 80%, such as between about 50% and about 70%, most particularly between about 50% and about 60%. In yet further particular embodiments, the first coating composition of the fiber cement products suitable for being subjected to inkjet-printing is characterized by a pigment volume concentration of between about 40% and about 50%, more particularly between about 45% and about 50%, such about 46%.

In particular embodiments, the binder in the first coating composition provided on the outer surface of the fiber cement products according to the present invention is an acrylic polymer. In further particular embodiments, the acrylic polymer is chosen from the group consisting of styrene acrylic, siloxane acrylic, epoxy acrylic, polyester acrylic, polyuria acrylic and urethane acrylic.

In a second aspect, the present invention provides processes for producing fiber cement products suitable for being subjected to ink-jet printing, said processes at least comprising the steps of:
  providing a fiber cement product,
  applying to at least part of the outer surface of the fiber cement product one or more layers of a first coating composition, which composition at least comprises a binder and a pigment and is characterized by a pigment volume concentration (PVC) of higher than about 40%, and
  curing the one or more layers of the first coating composition so as to obtain a fiber cement product suitable for being subjected to inkjet-printing.

In particular embodiments of these processes for producing fiber cement products suitable for being subjected to ink-jet printing, the first coating composition is characterized by a pigment volume concentration of at least about 50%, more particularly between about 50% and about 80%, such as between about 50% and about 70%, most particularly between about 50% and about 60%.

In further particular embodiments of these processes for producing fiber cement products suitable for being subjected to ink-jet printing, the binder in the first coating composition is an acrylic polymer. In further particular embodiments, the acrylic polymer is chosen from the group consisting of styrene acrylic, siloxane acrylic, epoxy acrylic, polyester acrylic, polyuria acrylic and urethane acrylic.

In a third aspect, the present invention provides processes for producing ink-jet printed fiber cement products, the processes at least comprising the steps of:

providing a fiber cement product suitable for being subjected to inkjet-printing, as described herein, which fiber cement products at least comprise on at least part of their outer surface one or more cured layers of a first coating composition, which composition at least comprises a binder and a pigment and is characterized by a pigment volume concentration (PVC) of higher than about 40%, applying an ink print on top of the one or more cured layers of the first coating composition by means of an inkjet-printer, and drying the ink print, so as to obtain an ink-jet printed fiber cement product.

In particular embodiments of the processes of the invention for producing ink-jet printed fiber cement products, the ink print is formed by using an ink comprising at least one inorganic pigment.

In further particular embodiments, the processes of the invention for producing ink-jet printed fiber cement products, further comprise the steps of:

applying one or more layers of a radiation-curable second coating composition on top of the one or more cured layers of the first coating composition and/or on top of the dried ink print, and radiation curing the one or more layers of the radiation-curable second coating composition.

In a fourth aspect, the present invention provides ink-jet printed fiber cement products obtainable by the processes as described above, which ink-jet printed fiber cement products at least comprise on at least part of their outer surface:

one or more cured layers of a first coating composition, at least comprising a binder and a pigment, wherein the first coating composition is characterized by a pigment volume concentration of higher than about 40%, and a dried ink print applied on top of the one or more cured layers of a first coating composition.

In particular embodiments, the ink print on the ink-jet printed fiber cement products of the invention is formed by using a pigmented ink, which is solvent-based or which is water-based.

In particular embodiments, the ink print on the ink-jet printed fiber cement products of the invention is formed by using an ink comprising at least one inorganic pigment.

In particular embodiments, the ink is not a UV-cured ink.

In further particular embodiments, the ink-jet printed fiber cement products of the invention further comprise one or more radiation-cured layers of a second coating composition applied on top of the one or more cured layers of the first coating composition and/or on top of the dried ink print.

In a fifth aspect, the present invention provides uses of the fiber cement products suitable for being subjected to ink-jet printing or uses of the ink-jet printed fiber cement products as building materials. In particular embodiments, the fiber cement products produced by the processes of the present invention can be used to provide an outer surface to walls, both internal as well as external, a building or construction, e.g. as façade plate, siding, etc.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
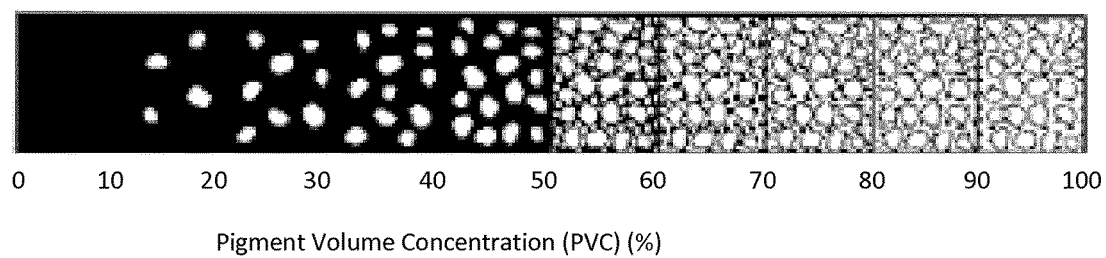
FIG. 1 shows a schematic drawing of the composition of a coating composition comprising at least a binder and at least a pigment with gradually increasing pigment volume concentrations.
Figure 2:
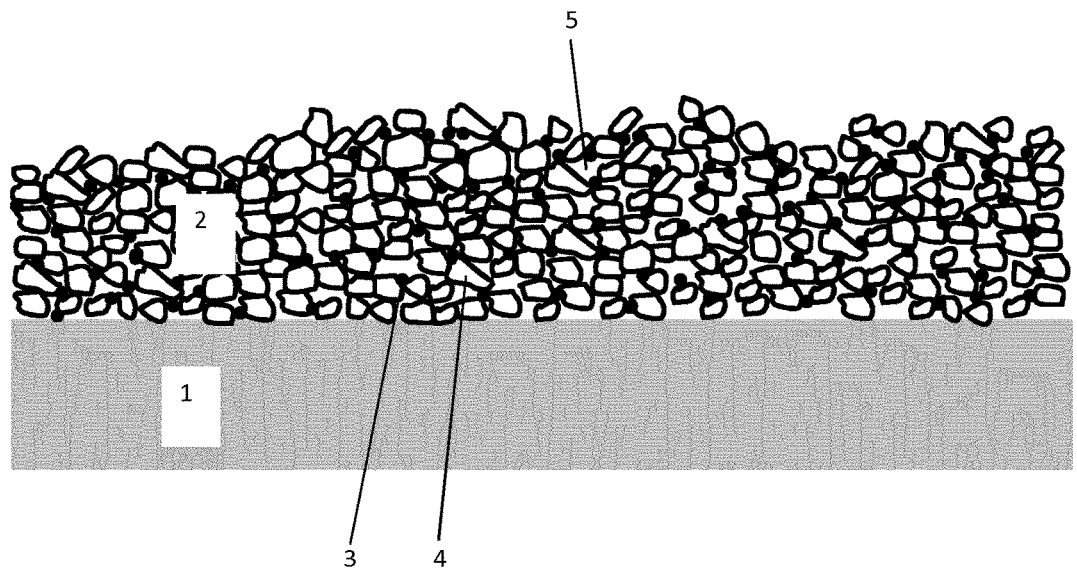
FIG. 2 shows a schematic drawing of a side view of a fiber cement product suitable for being subjected to ink-jet printing according to an embodiment of the invention.
Figure 3:
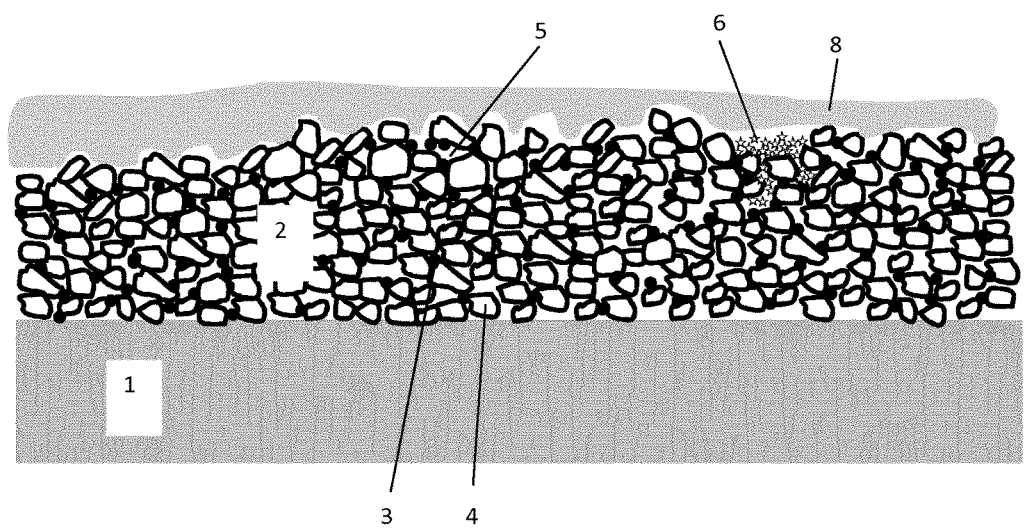
FIG. 3 shows a schematic drawing of a side view of an ink-jet printed fiber cement product according to an embodiment of the invention.
Figure 4:
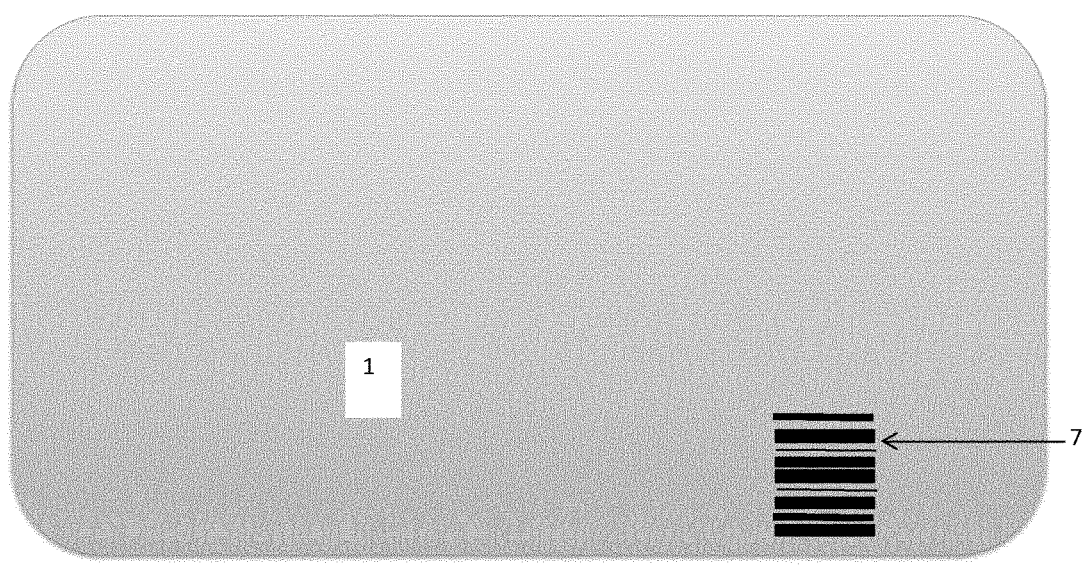
FIG. 4 shows a schematic drawing of a top view of an ink-jet printed fiber cement product according to an embodiment of the invention.

The same reference signs refer to the same, similar or analogous elements in the different figures.

1 Fiber cement product
2 Cured first coating composition
3 Binder
4 Pigment
5 Voids
6 Ink pigment
7 Ink print
8 Radiation-cured second coating composition

DESCRIPTION OF ILLUSTRATIVE EMBODIMENTS

The present invention will be described with respect to particular embodiments.

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

"Fiber(s)" present in the fiber cement slurry as described herein may be for example process fibers and/or reinforcing fibers which both may be organic fibers (typically cellulose fibers) or synthetic fibers (polyvinylalcohol, polyacrilonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The term "water-permeable" as used herein when referring to a water-permeable (region of a) transport belt generally means that the material of which the water-permeable (region of the) belt is made allows water to flow through its structure to a certain extent.

The "water-permeability" as used herein when referring to the water-permeability of a (region of a) transport belt generally refers to the extent or degree to which the material of which the water-permeable (region of the) belt is made, allows water to flow through its structure. Suitable materials for water-permeable transport belts are known to the person skilled in the art, such as but not limited to felts.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

The term "pigment volume concentration (abbreviated as PVC)" as used herein generally refers to the amount of pigment(s) versus the total amount of solids (i.e. pigment(s), binder(s), other solids) in a coating composition and can be calculated via the following mathematical formula:

"Pigment volume concentration" (expressed in %)="PVC" (expressed in %)=Volume of pigment/(Volume of solids)*100 (expressed in %)=Volume of pigment/(Volume of pigment+Volume of solid binder)*100(expressed in %)=Volume of pigment/(Volume of pigment+Volume of non-volatile binder)*100 (expressed in %)

The term "Effective pigment volume concentration (abbreviated as effective PVC)" as used herein generally refers to the amount of prime pigments (as defined herein) versus the total amount of prime pigments and binder(s) in a coating composition and can be calculated via the following mathematical formula:

"Effective pigment volume concentration" (expressed in %)="Effective PVC" (expressed in %)=(Volume of prime pigments)/(Volume of prime pigments+volume of solid binder(s))*100 (expressed in %)

The term "pigment" as used herein refers to a dry insoluble substance, usually pulverized, which when suspended in a liquid vehicle becomes a paint, ink, etc. Pigments typically consist of tiny solid particles that are used to enhance the appearance by providing color and/or to improve the physical (functional) properties of the paint or ink. Pigments used to provide color generally range from 0.2 to 0.4 microns in diameter. Functional pigments are typically 2-4 microns in diameter, but they may be as large as 50 microns.

The term "prime pigment" as used herein refers to any pigment (as defined herein), which is capable of providing whiteness and/or color to a substance while also contributing significantly to the hiding power of said substance. Prime pigments can be subdivided in white pigments and color pigments.

The term "white pigment" as referred to herein means a prime pigment, capable of scattering light and providing whiteness and hiding in flat or glossy paint or ink. White inorganic pigments include but are not limited to antimony pigments including Antimony White: $Sb_2O_3$; lead pigments (toxic) including White Lead $(PbCO_3)_2.Pb(OH)_2$; titanium pigments including Titanium White: titanium(IV) oxide $TiO_2$ and; zinc pigments including Zinc White: Zinc Oxide (ZnO).

The term "color pigment" as referred to herein means a prime pigment, capable of selectively absorbing light and providing color to a paint or ink. There are two main types of color pigments: organic pigments, which include the brighter colors but are not highly durable in exterior use and inorganic pigments, which are not as bright as organic colors but are the most durable exterior pigments.

The term "inorganic pigment" as used herein refers to naturally occurring mineral coloring compounds typically consisting of metallic salts. Inorganic pigments are usually oxides or sulphides of one or more metals. Inorganic pigments include for instance but are not limited to:

Blue Inorganic Pigments:

aluminum pigments, including ultramarine: a complex naturally occurring pigment of sulfur-containing sodio-silicate ($Na_{8-10}Al_6Si_6O_{24}S_{2-4}$);

cobalt pigments, including Cobalt Blue and Cerulean Blue:cobalt(II) stannate;

copper pigments, including Egyptian Blue: a synthetic pigment of calcium copper silicate ($CaCuSi_4O_{10}$) and Han Blue BaCuSi4O10; and iron pigments, including Prussian Blue: a synthetic pigment of ferric hexacyanoferrate ($Fe_7(CN)_{18}$);

Green Inorganic Pigments cadmium pigments, including\\EBM.Infra.Shared.Etex\wiki\Cadmium pigments Viridian: a dark green pigment of hydrated chromium(III) oxide ($Cr_2O_3$) and Cadmium Green: a light green pigment consisting of a mixture of Cromium Yellow (CrS) and Viridian ($Cr_2O_3$);

chromium pigments, including Chrome Green;

copper pigments, including Paris Green: copper(II) acetoarsenite ($Cu(C_2H_3O_2)_2.3Cu(AsO_2)_2$) and Scheele's Green (also called Schloss Green): copper arsenite $CuHAsO_3$;

Yellow Inorganic Pigments arsenic pigments including Orpiment natural monoclinic arsenic sulfide ($As_2S_3$);

cadmium pigments including Cadmium Yellow:cadmium sulfide (CdS);

chromium pigments including Chrome Yellow: natural pigment of lead(II) chromate ($PbCrO_4$);

cobalt pigments including Aureolin (also called Cobalt Yellow): Potassium cobaltinitrite ($Na_3Co(NO_2)_6$;

iron pigments including Yellow Ochre: a naturally occurring clay of hydrated iron oxide ($Fe_2O_3.H_2O$);

lead pigments including Naples Yellow;

titanium pigments including Titanium Yellow;

tin pigments including Mosaic gold: stannic sulfide ($SnS_2$);

Orange Inorganic Pigments cadmium pigments including Cadmium Orange: an intermediate between cadmium red and cadmium yellow: cadmium sulfoselenide;

chromium pigments including Chrome Orange: a naturally occurring pigment mixture composed of lead(II) chromate and lead(II) oxide. ($PbCrO_4+PbO$)

Red Inorganic Pigments cadmium pigments including Cadmium Red: cadmium selenide (CdSe);

iron oxide pigments including Sanguine, Caput Mortuum, Oxide Red, Red Ochre: anhydrous $Fe_2O_3$, Burnt Sienna: a pigment produced by heating Raw Sienna, Venetian Red;

lead pigments (toxic) including Red Lead: lead tetroxide, $Pb_3O_4$;

mercury pigments (toxic) including Vermilion: Synthetic and natural pigment: Occurs naturally in mineral cinnabar; Mercuric sulfide (HgS);

Brown Inorganic Pigments clay earth pigments (naturally formed iron oxides) including Raw Umber: A natural clay pigment consisting of iron oxide, manganese oxide and aluminum oxide: $Fe_2O_3+MnO_2+nH_2O+Si+AlO_3$;

Raw Sienna: a naturally occurring yellow-brown pigment from limonite clay;

Black Inorganic Pigments

Carbon pigments including Carbon Black, Ivory Black, Vine Black, Lamp Black;

Iron Pigments including $Fe_3O_4$;

Titanium pigments: Titanium Black;

Grey Inorganic Pigments

Payne's grey: a mixture of Ultramarine and black or of Ultramarine and Sienna;

The term "organic pigment" as used herein refers to synthetic organic coloring compounds, which are carbon based molecules manufactured from petroleum compounds, acids, and other chemicals, usually under intense heat or pressure.

Organic pigments include for instance but are not limited to:

Yellow Organic Pigments:

Yellow Lakes, which are transparent pigments used as a yellow to cover other inks but not hide them, Tartrazine Yellow Lake (also called FD&C Yellow No. 5 and used as a dyestuff in foods), Hansa Yellows, and Diarylide Yellows, which are the most common yellow pigments used in printing inks. Fluorescent Yellow is also used in some specialty applications. Organic Yellows are commonly used to replace Chrome Yellows;

Orange Organic Pigments:

The most common orange pigment is Diarylide Orange, a transparent yet not very fast-to-light pigment. Other assorted orange materials tend to be used where orange pigments are necessary, and include DNA Orange, Pyrazolone Orange, Fast Orange F2G, Benzimidazolone Orange HL, and Ethyl Lake Red C;

Red Organic Pigments:

Reds include Para Reds, Toluidine Red, ["Permanent Red "R"], Carmine F.B., Naphthol Reds and Rubines, Permanent Red FRC, Bordeaux FRR, Rubine Reds, Lithol Reds, BON Red, Lithol Rubine 4B, BON Maroon, Rhodamine 6G, Lake Red C, BON Arylamide Red, Quinacrinone Magentas, Copper Ferrocyanide Pink, Benzimidazolone Carmines and Reds, Azo Magenta G, Anthraquinone Scarlet, and Madder Lakes;

Blue Organic Pigments:

'Blues'. Blues include Phthalocyanine Blues (the most commonly used group of organic blue pigments), PMTA Victoria Blue, Victoria Blue CFA, Ultramarine Blue, Indanthrene Blue, Alkali Blues, and Peacock Blue;

Violet Organic Pigments:

Violets overlap slightly with some of the bluer reds (such as Benzimidazolone Bordeaux HF 3R (see Benzimidazolone Carmines and Reds), and also include such pigments as PMTA Rhodamine, PMTA Violet (also known as Methyl Violet), Dioxazine Violet (RL) Carbazole Violet, Crystal Violet, Dioxazine Violet B, and Thioindigoid Red;

Green Organic Pigments:

A common series of greens are the Phthalocyanine Greens as well as the PMTA Greens;

Brown Organic Pigments:

Brown pigments include Diazo Brown and Benzimidazolone Brown HER;

The terms "extender pigment" or "filler pigment" as used herein refers to any pigment (as defined herein) having a low refractive index or opacity and therefore not providing color or hiding power to a substance. Extender or filler pigments appear transparent in a paint or ink. Extender pigments have significant positive effects on various properties of the paint for example, as described further below, mica can improve the water resistance of a film due to its "platy" particle shape and tendency to orient itself in overlapping layers horizontal to the surface. Extender pigments or filler pigments for instance include but are not limited to Barium Sulphate, Calcium Carbonate, Magnesium Silicate, Mica, Kaolin (China Clay), Asbestine, Talc, Silica/Quartz, Alumina Hydrate, Kalunite, Pumice, Bentonite, Vermiculite, and Glass Beads.

The term "UV-curable" or "UV-cured" refers to a composition that can polymerize upon application of UV irradiation. Typically, this at least implies the presence of photo-polymerizable monomers or oligomers, together with photoinitiators and/or photosensitizers.

The term "solvent-based ink" as used herein refers to an ink comprising pigments in a colloidal suspension in a solvent other than water. The main solvent in solvent-based inks is typically one or more volatile organic compounds, such as but not limited to ethanol, ethyl acetate, ethylene glycol, glycol esters, hexane, isopropanol, nmethanol, methyl ethyl ketone, mineral spirits, naphthas, normal propyl acetate, normal propyl alcohol, toluene and xylene.

The term "water-based ink" as used herein refers to an ink comprising pigments in a colloidal suspension in water. All though the main solvent in water-based inks is water, there can also be other co-solvents present. These co-solvents typically are volatile organic compounds, such as but not limited to ethanol, ethyl acetate, ethylene glycol, glycol esters, hexane, isopropanol, nmethanol, methyl ethyl ketone, mineral spirits, naphthas, normal propyl acetate, normal propyl alcohol, toluene and xylene.

The terms "UV-cured ink" or "UV-curable ink" as interchangeably used herein refer to an ink composition that can polymerize upon application of UV irradiation. A "UV-cured ink" or "UV-curable ink" as used herein refers to an ink composition which does not comprise a solvent but rather comprises one or more pigments embedded in a matrix of photo-polymerizable monomers and/or oligomers, and photoinitiators and/or photosensitizers.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

The present invention provides fiber cement products having improved properties with regard to the capability of being subjected to ink-jet printing processes. In particular, up to now, the problem has always existed that printing, and in particular ink-jet printing with solvent-based or water-based inks, was very difficult, if not impossible, to achieve on fiber cement surfaces per se. This is unlike other materials, such as ceramics or glass, which are easily provided with informative or decorative patterns by ink-jet printing. The main reason for this difference is that fiber cement compositions have the inherent structural properties of a high degree of heterogeneity and surface roughness, inevitably causing issues of ink bleeding, a phenomenon that is characterized by jagged print edges and even undesirable ink stains around or adjacent to the printed patterns or prints.

In order to solve these problems, the present inventors have developed novel and improved fiber cement products that can be ink-jet printed with traditional solvent-based or water-based pigmented inks with high efficiency and performance.

In particular, it was found that by coating fiber cement products with a coating composition, wherein the amount of pigments versus the total amount of solids (e.g. pigments and solid binder components) in the coating composition (i.e. the so-called "pigment volume concentration" (PVC) of the coating composition) is higher than about 40%, ink-jet printing can be performed without encountering any of the above-stated issues.

The inventors believe that this observed beneficial effect is due to the fact that the porosity of a coating layer having a PVC of at least about 40% is higher than the porosity of outer surfaces of known coated fiber cement products. This increased porosity results in the fact that the coating layer applied to the fiber cement products is able to absorb and capture the ink composition relatively quickly after ink-jetting, thereby preventing this ink composition from being able to spread out over the surface of the coated fiber cement product.

Accordingly, the fiber cement products according to the present invention are characterized by comprising a pigmented coating layer with a PVC of at least about 40%, thereby achieving the effect of obtaining both a uniform surface and a homogenous and high porosity. This effect has the advantage that, when these products are submitted to ink-jet printing with a solvent-based or with a water-based ink, a homogeneous and equal print quality all over the surface of the fiber cement product is obtained.

Thus, in a first aspect, the present invention provides fiber cement products suitable for being subjected to inkjet-printing, which fiber cement products at least comprise on at least part of their outer surface one or more cured layers of a first coating composition, which composition at least comprises a binder and a pigment and is characterized by a pigment volume concentration (PVC; as defined herein) of higher than about 40%.

In the context of the present invention, fiber cement products are to be understood as cementitious products comprising cement and synthetic (and optionally natural) fibers. The fiber cement products are made out of fiber cement slurry, which is formed in a so-called "green" fiber cement product, and then cured.

Dependent to some extent on the curing process used, the fiber cement slurry typically comprises water, process or reinforcing fibers which are synthetic organic fibers (and optionally also natural organic fibers, such as cellulose), cement (e.g. Portland cement), limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, antifoaming agents, flocculants, and/or other additives. Optionally color additives (e.g. pigments) are added, to obtain a fiber cement product which is so-called colored in the mass.

In particular embodiments, the fiber cement products of the invention have a thickness of between about 4 mm and about 200 mm, in particular between about 6 mm and about 200 mm, more in particular between about 8 mm and about 200 mm, most in particular between about 10 mm and about 200 mm.

The fiber cement products as referred to herein include roof or wall covering products made out of fiber cement, such as fiber cement sidings, fiber cement boards, flat fiber cement sheets, corrugated fiber cement sheets and the like. According to particular embodiments, the fiber cement products according to the invention can be roofing or façade elements, flat sheets or corrugated sheets. According to further particular embodiments, the fiber cement products of the present invention are fiber cement sheets.

The fiber cement products of the present invention comprise from about 0.1 to about 5 weight %, such as particularly from about 0.5 to about 4 weight % of fibers, such as more particularly between about 1 to 3 weight % of fibers with respect to the total weight of the fiber cement product.

According to particular embodiments, the fiber cement products according to the invention are characterized in that it comprises fibers chosen from the group consisting of cellulose fibers or other inorganic or organic reinforcing fibers in a weight % of about 0.1 to about 5. In particular embodiments, organic fibers are selected from the group consisting of polypropylene, polyvinylalcohol polyacrylonitrile fibers, polyethyelene, cellulose fibres (such as wood or annual kraft pulps), polyamide fibers, polyester fibers, aramide fibers and carbon fibers. In further particular embodiments, inorganic fibers are selected from the group consisting of glass fibers, rockwool fibers, slag wool fibers, wollastonite fibers, ceramic fibers and the like. In further particular embodiments, the fiber cement products of the present invention may comprise fibrils fibrids, such as for example but not limited to, polyolefinic fibrils fibrids % in a weight % of about 0.1 to 3, such as "synthetic wood pulp".

According to certain particular embodiments, the fiber cement products of the present invention comprise 20 to 95 weight % cement as hydraulic binder.

Cement in the products of the invention is selected from the group consisting of Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

According to particular embodiments, the fiber cement products according to the invention optionally comprise further components. These further components in the fiber cement products of the present invention may be selected from the group consisting of water, sand, silica sand flour, condensed silica fume, microsilica, fly-ashes, amorphous silica, ground quartz, the ground rock, clays, pigments, kaolin, metakaolin, blast furnace slag, carbonates, puzzolanas, aluminium hydroxide, wollastonite, mica, perlite, calcium carbonate, and other additives (e.g. colouring additives) etc. It will be understood that each of these components is present in suitable amounts, which depend on the type of the specific fiber cement product and can be determined by the person skilled in the art. In particular embodiments, the total quantity of such further components is preferably lower than 70 weight % compared to the total initial dry weight of the composition.

Further additives that may be present in the fiber cement products of the present invention may be selected from the group consisting of dispersants, plasticizers, antifoam agents and flocculants. The total quantity of additives is preferably between about 0.1 and about 1 weight % compared to the total initial dry weight of the composition.

The first coating composition provided on the surface of the fiber cement products of the invention at least comprises a binder and a pigment.

Binders and pigments for coating compositions are known in the art and are not critical to the invention as long as the coatings are characterized by a pigment volume concentration (PVC; as defined herein) of higher than about 40%. In particular embodiments, the first coating layer provided on the surface of the fiber cement products of the invention is not curable by radiation or by chemical crosslinking.

Suitable binder compositions for use as a first coating layer in the products of the present invention are for example binders obtained by aqueous free radical or ionic emulsion polymerization. For instance, suitable binders for use as a first coating layer in the products of the present invention are acrylic and/or methacrylic (co-) polymers. Such acrylic and/or methacrylic (co-)polymers are usually prepared by aqueous radically initiated emulsion polymerization of esters of acrylic acid and/or methacrylic acid with C1-C12 alkanols as well as a minor amount of acrylic and/or methacrylic acid as monomers. In this regard, preference is given in particular to esters of acrylic and methacrylic acid with C1-C8 alkanols.

Thus, in particular embodiments, the binding polymer may be provided as a pure acrylic, a styrene acrylic, a fluoropolymer acrylic, a urethane acrylic, a vinyl acrylic and/or an acrylated ethylene vinyl acetate copolymer or combinations thereof. The polymer may be derived from at least one acrylic monomer, such as an acrylic acid, acrylic acid ester, methacrylic acid, and methacrylic acid ester. Typically, the binding polymer is derived from one or more monomers, examples of which include polyvinylidine fluoride, styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

In certain particular embodiments, the binding polymer of the first coating composition of the products of the invention is selected for degree of hydrophobicity and/or particle size. Polymeric particles for compositions described herein are typically in the nanometer size range, while polymeric particles in other conventional paint formulations range in size from 50 to 250 nanometers.

The binder of polymeric particles is typically provided at a weight percent (wt %) of less than 60%, preferably at a range at or about 20-55% for a water-based first coating provided herein.

The first coating composition provided on the surface of the fiber cement products of the invention further comprises one or more pigments so as to obtain a pigment volume concentration (PVC, as defined herein) of at least 40%. Pigments provide color, hiding, and/or are present as extenders. Pigments include those in the form of titanium oxide, iron oxides, calcium carbonate, spinell pigments, titanates, clay, aluminum oxide, silicon dioxide, magnesium oxide, magnesium silicate, barium metaborate monohydrate, sodium oxide, potassium oxide, talc, barytes, zinc oxide, zinc sulfite and mixtures thereof or organic alkaliresistant pigments such as phtalocyanines and azo compounds.

In particular embodiments, the first coating composition according to the invention comprises one or more prime pigments (as defined herein) such that an effective pigment volume concentration (effective PVC, as defined herein) of at least 40% is achieved. As defined herein, the volume percentage of pigments other than prime pigments, such as but not limited to the volume of extender pigments or filler pigments (as defined herein), is not included in the calculation of the effective pigment volume concentration. The effective PVC of the first coating composition is therefore calculated only by taking into consideration the volume of prime pigments versus the total volume of prime pigment(s) and solid binder(s) in the composition. The inventors have found that when prime pigments are present in the first coating composition in an effective pigment volume concentration of at least 40%, extremely good printing results are achieved. In particular embodiments, the one or more prime pigments included in the first coating composition provided on the surface of the fiber cement products of the invention are one or more white colored pigments, such as but not limited to antimony pigments, barium pigments, lead pigments, titanium pigments, and zinc pigments. In further particular embodiments, the one or more prime pigments included in the first coating layer provided on the surface of the fiber cement products of the invention are one or more white colored pigments, such as but not limited to stibous oxide (Antimony White, $Sb_2O_3$), basic plumbous carbonate (PW1, Cremnitz White, $(PbCO_3)_2.Pb(OH)_2$), titanic oxide (PW6, Titanium White, $TiO_2$), and zinc oxide (PW4, Zinc White, ZnO).

In further particular embodiments, the prime pigments suitable for use in the first coating composition in the processes and products of the present invention so as to obtain an effective PVC of at least 40% are one or more white prime pigments. In yet further particular embodiments, the prime pigments suitable for use in the first coating composition in the processes and products of the present invention at least comprise titanium dioxide ($TiO_2$).

In particular embodiments of the present invention, the pigments suitable for use in the first coating composition in the processes and products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

The coating composition used for providing the first coating layer on the surface of the fiber cement products of the invention further comprises, besides the polymeric binders and pigments, also usual auxiliaries, e.g. fillers, coalescing agents, anti-blistering agents, rheology modifiers, surfactants, wetting agents, viscosity modifiers, dispersants, defoamers, preservatives and hydrophobisizers, biocides, fibers, colorants, waxes, perfumes and co-solvents and other usual constituents. Examples of suitable fillers are aluminosilicates, silicates, alkaline-earth metal carbonates, preferably calcium carbonate in the form of calcite or lime, dolomite, and also aluminum silicates or magnesium silicates, e.g. talc.

Accordingly, the coating composition used for providing the first coating layer on the surface of the fiber cement products of the invention further may comprise one or more film-forming aids or coalescing agents. Suitable firm-forming aids or coalescing agents include glycol ethers (e.g., products from Eastman Chemical Company, Kingsport, Tenn., including DB, EB, PM, EP) and ester alcohols (e.g., products from Eastman Chemical Company, Kingsport, Tenn., including Texanol), as examples.

In addition to the above, the coating composition used for providing the first coating layer on the surface of the fiber cement products of the invention further may comprise one or more additives included for properties, such as regulating flow and leveling, sheen, foaming, yellowing, resistance to stains, cleaner, burnish, block, mildew, dirt, or corrosion, and for retaining color and gloss.

The emulsion polymerization of the coating composition requires the use of surfactants as stabilizers. Non-ionic surfactants are preferred. Alcohol ethoxylates are particularly preferred. Conventional coatings with a hydroxyl number (measured according to ISO 4629) of at least 1 are preferred. Hydroxyl numbers of at least 1.5 are particularly preferred.

Examples of suitable surface-active dispersing or wetting agents include those available under the trade designations, such as STRODEX™ KK-95H, STRODEX™ PLF100, STRODEX™ PKOVOC, STRODEX™ LFK LFK70, STRODEX™ SEK50D, and DEXTROL® OC50 (trademarks of Dexter Chemical LLC, Wilmington, Del.); HYDROPALAT™ 100, HYDROPALAT™ 140, HYDROPALAT™ 44, HYDROPALAT™ 5040 and HYDROPALAT™ 3204 (trademarks of Cognis Corp., Monheim, Germany); LIPOLIN™ A, DISPERS™ 660C, DISPERS™ 715W (trademarks of Evonik Degussa GmbH, Germany); BYK® 156, BYK® 2001 and ANTI-TERRA™ 207 (trademarks of Byk-Cera, Germany); DISPEX™ A40, DISPEX™ N40, DISPEX™ R50, DISPEX™ G40, DISPEX™ GA40, EFKA® 1500, EFKA® 1501, EFKA® 1502, EFKA® 1503, EPKA™ 3034, EFKA® 3522, EFKA® 3580, EFKA™ 3772, EFKA® 4500, EFKA® 4510, EFKA® 4520, EFKA® 4530, EFKA® 4540, EFKA® 4550, EFKA® 4560, EFKA® 4570, EFKA® 6220, EFKA® 6225, EFKA® 6230 and EFKA® 6525 (trademarks of Ciba Specialty Chemicals, Basil, Switzerland); SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SYRFYNOL™ 104, SURFYNOL™ PSA-336, SURFYNOL™ 420, SURFYNOL™ 440, ENVIROGEM™ AD-01 and ENVIROGEM™ AE01 (trademarks of Air Products and Chemicals, Inc., Lehigh Valley, Pa.); TAMOL™ 1124, TAMOL™ 165A, TAMO™ 850, TAMOL™ 681, TAMOL™ 731 and TAMOL™ SG-1 (trademarks of Rohm & Haas Company, Philadelphia, Pa.); IGEPAL™ CO-210, IGEPAL™ CO-430, IGEPAL™ CO-630, IGEPAL™ CO-730, and IGEPAL™ CO-890 (trademarks of Rhodia Inc., Cranbury, N.J.); T-DET™ and T-MULZ™ (trademarks of Harcros Chemicals Inc., Kansas City, Kans.).

Examples of suitable defoamers include but are not limited to BYK™ 018, BYK® 019, BYK® 020, BYK® 022, BYK® 025, BYK® 032, BYK® 033, BYK® 034, BYK® 038, BYK® 040, BYK® 060, BYK® 070 and BYK® 077 (trademarks of Byk-Cera, Germany); SURFYNOL™ DF-695, SURFYNOL™ DF-75, SURFYNOL™ DF-62, SURFYNOL™ DF-40 and SURPYNOL™ DF-110D (trademarks of Air Products and Chemicals, Inc., Lehigh Valley, Pa.); DEE FO® 3010A, DEE FO® 2020E/50, DEE FO® 215, DEE FO® 806-102 and AGITAN™ 31BP, AGITAN™ 731 (trademarks of Munzing Chemie GmbH, Germany); EFKA® 2526, EFKA® 2527 and EFKA® 2550 (trademarks of Ciba Specialty Chemicals, Basil, Switzerland); TEGO® Foamex 8050, TEGO® Foamex 1488, TEGO® Foamex 7447, TEGO® Foamex 800, TEGO® Foamex 1495 and TEGO® Foamex 810 (trademarks of Evonik Degussa GmbH, Germany); FOAMASTER® 714, FOAMASTER® A410, FOAMASTER® 111, FOAMASTER® 333, FOAMASTER® 306, FOAMASTER® SA-3, FOAMASTER® AP, DEHYDRAN® 1620, DEHYDRAN® 1923 and DEHYDRAN® 671 (trademarks of Cognis Corp., Monheim, Germany).

A thickener and rheology modifier is included for improving spreading, handling, and application of the coating composition, when desired. Preferably, the thickener is a non-cellulosic thickener due to preferred non moisture swelling characteristics. Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Cellulosic thickeners perform by swelling in water and are undesirable in several preferred embodiments as further described herein. Representative examples of suitable associative thickeners used herein include Acrysol™ RM 8W and Acrysol™ RM-2020 NPR (trademarks of Rohm & Haas Company, Philadelphia, Pa.).

Coating compositions used for providing the first coating layer on the surface of the fiber cement products of the invention further may also comprise other additives, such as plasticizer, anti-foam agent, pH adjuster (amine or ammonia), tinting color, and biocide. Such coating additives are typically present in the formulation in an amount from about 0 to about 18% by weight or up to 18 by weight and from about 1 to about 15% by weight based on the total weight of the formulation. In addition, coating compositions used for providing the first coating layer on the surface of the fiber cement products of the invention may include one or more functional extenders to increase coverage, reduce cost, achieve durability, alter appearance, control rheology, and/or influence other desirable properties. Examples of functional extenders include, for example, barium sulphate, aluminum silicate, magnesium silicate, barium sulphate, calcium carbonate, clay, gypsum, silica, and talc.

In several embodiments, it will be desirable to include a biocide or mildewicide, or fungicide to the coating compositions used for providing the first coating layer on the surface of the fiber cement products of the invention. Preferred examples include but are not limited to barium sulphate, ROZONE™ 2000, BUSAN™ 1292, BUSAN 11M1, BUSAN 11M2, and BUSAN 1440 (trademarks of Rohm & Haas Company, Philadelphia, Pa., or its subsidiaries or affiliates); POLYPHASE® 663 and POLYPHASE® 678 (trademark of Troy Chemical Corporation, Newark, N.J.); and KATHON™ LX (trademark of Rohm & Haas Company, Philadelphia, Pa., or its subsidiaries or affiliates.) Coating compositions used for providing the first coating layer on the surface of the fiber cement products of the invention are typically formulated to include at least about 50% by volume of dry solids. In particular embodiments, the balance of the coating compositions used for providing the first coating layer on the surface of the fiber cement products of the invention is water. Water is present with the binding polymer when provided in a dispersion and in other components of the coating compositions. Water is generally also added separately.

In particular embodiments, the first coating composition of the fiber cement products suitable for being subjected to inkjet-printing is characterized by a pigment volume concentration (PVC, as defined herein) of at least about 40%, particularly between about 40% and about 80%, such as between about 40% and about 70%, more particularly between about 40% and 60%. In further particular embodiments, the first coating composition of the fiber cement products suitable for being subjected to inkjet-printing is characterized by a pigment volume concentration of at least about 50%, more particularly between about 50% and about 80%, such as between about 50% and about 70%, most particularly between about 50% and about 60%. In yet further particular embodiments, the first coating composition of the fiber cement products suitable for being subjected to inkjet-printing is characterized by a pigment volume concentration of between about 40% and about 50%, more particularly between about 45% and about 50%, such about 46%. In further particular embodiments, the cured first coating layer of the fiber cement products suitable for being subjected to inkjet-printing is characterized by a pigment volume concentration (PVC) of at least about 40%, such as at least about 45%, in particular at least about 50%, such as at least about 55%, more particularly at least about 60%, such as at least about 65%, most particularly at least about 70%, such as at least about 75%, or at least about 80%.

In yet further particular embodiments, the first coating composition of the fiber cement products suitable for being subjected to inkjet-printing is characterized by an effective pigment volume concentration (effective PVC, as defined herein) of at least about 40%, particularly between about 40% and about 80%, such as between about 40% and about 70%, more particularly between about 40% and 60%. In further particular embodiments, the first coating composition of the fiber cement products suitable for being subjected to inkjet-printing is characterized by an effective pigment volume concentration of at least about 50%, more particularly between about 50% and about 80%, such as between about 50% and about 70%, most particularly between about 50% and about 60%. In yet further particular embodiments, the first coating composition of the fiber cement products suitable for being subjected to inkjet-printing is characterized by an effective pigment volume concentration of between about 40% and about 50%, more particularly between about 45% and about 50%, such about 46%. In further particular embodiments, the cured first coating layer of the fiber cement products suitable for being subjected to inkjet-printing is characterized by an effective pigment volume concentration (PVC) of at least about 40%, such as at least about 45%, in particular at least about 50%, such as at least about 55%, more particularly at least about 60%, such as at least about 65%, most particularly at least about 70%, such as at least about 75%, or at least about 80%.

In particular embodiments, the minimum film forming temperature during the drying of the one or more layers of the first coating composition of the fiber cement products suitable for being subjected to inkjet-printing is below about 60° C.

In further particular embodiments, the first coating composition used for providing the one or more first coating layers on the surface of the fiber cement products of the invention comprises as liquid component essentially water and, if desired, an organic liquid miscible with water, for example an alcohol. The first coating composition is applied as a wet coating weight in the range from about 30 to about 500 g/m$^2$, in particular from about 40 to about 300 g/m$^2$, more in particular from about 50 to about 500 g/m$^2$, in a known manner, for example by spraying, trowelling, knife application, brushing, rolling, curtain coating or pouring onto the cement bonded board, or by a combination of one or more applications. In particular embodiments, the first coating composition is preferably applied by spraying.

Thus the coating compositions described herein can be applied to a surface of a fiber cement product using a brush, blade, roller, sprayer (e.g., air-assisted or airless, electrostatic), vacuum coater, curtain coater, flood coater or any suitable device that promotes an even distribution of the coating composition over the surface, even if the surface is damaged, worn, or cracked. The coating compositions may be applied to provide a smooth surface, colored surface or textured surface. A portion or an entire surface of the fiber cement product may be coated at one time. In addition or as an alternative, all or a portion of the surface may be coated more than one time to achieve the desired thickness, gloss, and/or surface effect. The amount of coverage obtained by a quantity of the composition will vary depending on the desire and/or condition of the surface to be covered and the thickness of the coating applied.

In a second aspect, the present invention provides processes for producing a fiber cement product suitable for being subjected to ink-jet printing.

A first step in these methods of the invention is providing a fiber cement product, which can be performed according to any method known in the art for preparing fiber cement products, essentially consisting of at least water, cement and fibers.

In this step, a fiber cement slurry can first be prepared by one or more sources of at least cement, water and fibers. In certain specific embodiments, these one or more sources of at least cement, water and fibers are operatively connected to a continuous mixing device constructed so as to form a cementitious fiber cement slurry. In particular embodiments, when using cellulose fibers or the equivalent of waste paper fibers, a minimum of about 3%, such as about 4%, of the total slurry mass of these cellulose fibers is used. In further particular embodiments, when exclusively cellulose fibers are used, between about 4% to about 12%, such as more particularly, between about 7% and about 10%, of the total slurry mass of these cellulose fibers is used. If cellulose fibers are replaced by short mineral fibers such as rock wool, it is most advantageous to replace them in a proportion of 1.5 to 3 times the weight, in order to maintain approximately the same content per volume. In long and cut fibers, such as glass fiber rovings or synthetic high-module fibers, such as polypropylene, polyvinyl acetate, polycarbonate or acrylonitrile fibers the proportion can be lower than the proportion of the replaced cellulose fibers. The fineness of the fibers (measured in Shopper-Riegler degrees) is in principle not critical to the processes of the invention. Yet in particular embodiments, it has been found that a range between about 15 DEG SR and about 45 DEG SR can be particularly advantageous for the processes of the invention.

Once a fiber cement slurry is obtained, the manufacture of the fiber-reinforced cement products can be executed according to any known procedure. The process most widely used for manufacturing fiber cement products is the Hatschek process, which is performed using a modified sieve cylinder paper making machine. Other manufacturing processes include the Magnani process, injection, extrusion, flow-on and others. In particular embodiments, the fiber cement products of the present invention are provided by using the Hatschek process. The "green" or uncured fiber cement product is optionally post-compressed usually at pressures in the range from about 22 to about 30 MPa to obtain the desired density.

The processes according to the present invention may further comprise the step of cutting the fiber cement products to a predetermined length to form a fiber cement product. Cutting the fiber cement products to a predetermined length can be done by any technique known in the art, such as but not limited to water jet cutting, air jet cutting or the like. The fiber cement products can be cut to any desirable length, such as but not limited to a length of between about 1 m and about 15 m, such as between about 1 m and about 10 m, more particularly between about 1 m and about 5 m, most particularly between about 1 m and about 3 m.

It will be understood by the skilled person that the processes of the present invention may further comprise additional steps of processing the produced fiber cement products.

For instance, in certain particular embodiments, during the processes of the present invention, the fiber cement slurry and/or the fiber cement products may undergo various intermediate treatments, such as but not limited to treatment with one or more hydrophobic agents, treatment with one or more flocculants, additional or intermediate pressing steps, etc.

As soon as the fiber cement products are formed, these are trimmed at the lateral edges. The border strips can optionally be recycled through immediate mixing with the recycled water and directing the mixture to the mixing system again.

In particular embodiments, the obtained fiber cement products are cured. Indeed, after production, fiber cement products can be allowed to cure over a time in the environment in which they are formed, or alternatively can be subjected to a thermal cure (e.g. by autoclaving or the like).

In further particular embodiments, the "green" fiber cement product is cured, typically by curing to the air (air cured fiber cement products) or under pressure in presence of steam and increased temperature (autoclave cured). For autoclave cured products, typically sand is added to the original fiber cement slurry. The autoclave curing in principle results in the presence of 11.3 Å (angstrom) Tobermorite in the fiber cement product.

In yet further particular embodiments, the "green" fiber cement product may be first pre-cured to the air, after which the pre-cured product is further air-cured until it has its final strength, or autoclave-cured using pressure and steam, to give the product its final properties.

In particular embodiments of the present invention, the processes may further comprise the step of thermally drying the obtained fiber cement products. After curing, the fiber cement product being a panel, sheet or plate, may still comprise a significant weight of water, present as humidity. This may be up to 10 even 15% w, expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

The next step in the methods of the invention for producing fiber cement products suitable for being subject to ink-jet printing comprises applying to at least part of the outer surface of the fiber cement product, one or more layers of a first coating composition, which composition at least comprises a binder and a pigment and is characterized by a pigment volume concentration of higher than about 40%. Further characteristics of the first coating composition are as defined and described above for the products according to the invention.

A further step in the methods of the invention for producing fiber cement products suitable for being subject to ink-jet printing comprises curing the one or more layers of the first coating composition so as to obtain a fiber cement product suitable for being subjected to inkjet-printing. In principle, any suitable curing step known in the art can be applied for film-forming, drying and hardening the one or more layers of the first coating composition. In particular embodiments, the first coating composition is dried at room temperature or preferably at elevated temperature, for example from 40 to 150° C. The dry thickness of the first conventional coating is generally from about 20 Pm to about 100 Pm, preferably from about 50 Pm to about 70 Pm.

In a third aspect, the present invention provides processes for producing an ink-jet printed fiber cement product.

A first step in these processes comprises providing a fiber cement product according to the invention, which is suitable for being subjected to ink-jet printing as described herein, which product comprises on at least part of its outer surface one or more cured layers of a first coating composition at least comprising a binder and a pigment, wherein the first coating composition is characterized by a pigment volume concentration of higher than about 40%.

Before the ink print is applied, the first coating composition is dried at room temperature or preferably at elevated temperature, for example from about 40° C. to about 150° C. The dry thickness of the first coating composition is generally from about 20 µm to about 100 µm, preferably from about 50 µm to 70 µm.

A next step in the processes for producing an ink-jet printed fiber cement product according to the invention comprises applying an ink print on top of the one or more cured layers of the first coating composition by means of an inkjet-printer.

The step of applying an ink print on the one or more cured layers of a first coating composition of the fiber cement products according to the invention can be done by any known ink-jet based process using an ink, at least comprising: a liquid vehicle and one or more pigments.

Thus, in particular embodiments of the invention, the ink is not a UV-cured ink or a UV-curable ink (as defined herein), since these inks do not comprise a liquid vehicle.

The ink is characterized by several features. It has a viscosity which enables it to be printed by ink-jet printing, typically a viscosity (at room temperature) of below about 50 cps, or a viscosity at jetting temperature (the temperature present at the ink printhead during printing) of below about 20 cps, most preferably below about 15 cps, most preferably between about 10 and about 13 cps. The term "jetting temperature" refers to the temperature of the ink at the print head and is typically about 30° C. to about 60° C., preferably about 35° C. to about 45° C. The viscosity of the inks can for instance be measured by a Brookfield DV-II+ viscometer, with small sample adapter, while using spindle S18, at 80 rpm.

In particular embodiments, the ink compositions suitable for use in the processes and products of the present invention essentially comprise sub-micron particles of a heat resistant inorganic pigment. Preferably, the average size of the inorganic pigments is less than about 1.2 µm, preferably less than about 0.9 µm, more preferable less than about 0.7 µm, most preferably, the average size of the inorganic pigment particles is below about 550 nanometers (0.55%). The term "inorganic pigment" refers to a pigment, which is at least partially inorganic. By a preferred embodiment the inorganic pigments are metal oxides, which are a priori present in a form suitable for giving the desired properties. Various metal oxides may be used such as chromium oxide, copper oxide, mix oxides $CuCr_2O_3$ oxide (for black color), Red iron oxide (Pigment Red 101), Nickel antimony titanium yellow rutile (Pigment yellow 53), Cobalt Aluminate blue spinel (Pigment blue 28), etc.

In particular embodiments, wherein the color of the pigment in the ink compositions is white and thus the pigment is a white pigment (such as for example titanium dioxide ($TiO_2$)), the average size of the pigment particles is between about 0.17 µm to about 0.25 µm.

In particular embodiments of the present invention, the ink compositions suitable for use in the processes and products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

In particular embodiments of the present invention, the pigments in the ink compositions suitable for use in the processes and products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

The liquid vehicle present in the inks suitable for use in the present invention is liquid at room temperature of about 15° C. to about 28° C. According to certain embodiments, "solvent-based ink" is composed of at least one organic solvent (or a combination of several organic solvents). Alternatively, according to other embodiments, "water-based ink" is composed of a water-based solution.

According to certain embodiments, the liquid vehicle is an organic solvent such as PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPNB (tripropylene glycol mono n-butyl ether), PnP (propylene glycol mono propyl ether), DPnP (dipropylene glycol mono propyl ether), TPNB-H (propylene glycol butyl ether), PMA (propylene glycol mono methyl ether acetate), Dowanol DB (Diethylene glycol mono butyl ether) or other ethylene or propylene glycol ethers (Dow Chemical Company, USA). The vehicle may also be a mixture of two or more different organic solvents. In further particular embodiments, the liquid vehicle or solvent present in the inks suitable for use in the present invention is a solvent-based ink, such as an oil-based composition.

In particular embodiments, the solvent-based ink suitable for use in the products and processes of the present invention comprises at least one inorganic or at least one white pigment, and at least one solvent together with a dispersion agent.

In particular embodiments, the ink further comprises at least one dispersant or/and wetting agent, such as Bykumen (solution of a lower molecular weight unsaturated acidic polycarboxylic acid polyester and White spirit/lsobutanol=2/1), Disperbyk-166 (solution of a high molecular weight block copolymer with pigment affinic groups and Methoxypropylacetate/Butylacetate=1/4), Disperbyk-164 (solution of a high molecular weight block copolymer with pigment affinic groups and Butylacetate), Disperbyk-130 (solution of polyamine amides of unsaturated polycarboxylic acids and Alkylbenzene/Butylglycol=5/1), Disperbyk-182 (solution of a high molecular weight block copolymer with pigment affinic groups and Methoxypropylacetate/Methoxy-proppoxypropanol/Butylacetate=4/4/4), Disperbyk-163 (solution of high molecular weight block copolymer with pigment affinic groups, in xylene/butyl/acetate/methoxypropylacetate 3/1/1); Disperbyk-161 (solution of a high molecular weight block copolymer with pigment affinic groups and Methoxypropylacetate/Butylacetate=6/1), Disperbyk-101 (Solution of a salt of long chain polyamine amides, polar acidic esters and Mineral spirit/Butylglycol 8/1), Disperbyk-160 (solution of a high molecular weight block copolymer with pigment affinic groups and Xylene/Butylacetate=6/1), BYK-P-104 (solution of a lower molecular weight unsaturated polycarboxylic acid polymer and Xylene/Diisobutylketone=9/1), BYK-P-104 S (solution of a lower molecular weight unsaturated polycarboxylic acid polymer with a polysiloxane copolymer and Xylene/Diisobutylketone=9/1), Disperbyk-180 (Alkylolammonium salt of a block copolymer with acidic groups), Disperbyk-110 (solution of a copolymer with acidic groups and Methoxypropyl acetate/Alkylbenzene=1/1), BYK-348 (polyether modified poly-dimethyl-siloxane), BYK-346 (solution of a polyether modified poly-dimethyl-siloxane in Dipropyleneglycol monomethylether), BYK-381 (solution of an polyacrylic copolymer and dipropyleneglycol-monomethylether) (Chemie-BYK, Germany), BYK-306 (solution of a polyether modified poly-dimethyl-siloxane and xylene/monophenylglycol+7/2), BYK-358N (solution of polyacrylate copolymer and alkyl benzenes), BYK-333 (polyether modified poly-dimethyl-siloxane), Tego Dispers 650 (special modified polyether with pigment affinic groups), Tego Dispers 652 (concentrate of a fatty acid derivative), Tego Dispers 710 (solution of a basic urethane copolymer). (Tego-Chemie Service, Germany), Solsperse 43000 (50% polymeric dispersant in water), Solsperse 40000 (84% polymeric dispersant in water with diethanolamine) (Avecia, UK). Some of these dispersants is suitable for both solvent based and water based inkjet formulations and others for solvent based or water based inks or both.

The ink, in accordance with the invention may comprise additional components, typically selected from wetting agents, dispersing agents, defoamers, humectants, rheology control agents, organic polymers as binders and fixation agents which provide "green strength" (such as polyacrylates or polyvynilpyrrolidone, PVP) anticorrosive agents, coalescent agents, pH control agents and biocides.

The next step in the processes of the invention for producing an ink-jet printed fiber cement product comprises drying the ink print, so as to obtain an ink-jet printed fiber cement product. While there are different ways of drying or curing inks, an air-dryable oil-based ink comprising inorganic pigments is preferred for use in the present invention.

In further particular embodiments, the processes for producing ink-jet printed fiber cement products of the present invention comprise applying one or more layers of a radiation-curable second coating composition on top of said one or more cured layers of a first coating composition and/or on top of said dried ink print. The radiation-curable second coating composition of the process according to the present invention comprises at least one polymer having ethylenically unsaturated double bonds, which is radiation curable. Possible polymers for the radiation-curable coating compositions are in principle any polymer which has ethylenically unsaturated double bonds and which can undergo radical-initiated polymerization on exposure to UV radiation or electron beam radiation.

The monomers having unsaturated double bonds such as acryl amide monomers, meth acrylic acid monomers, (meth) acrylic acid monomers, N-vinyl pyrrolidone and crotonic acid as long as they are used in the jet inks, are preferred to be the polymerizable monomer.

Care should be taken here that the content of ethylenically unsaturated double bonds in the polymer is sufficient to ensure effective crosslinking. The content of ethylenically unsaturated double bonds in the is generally in the range from about 0.01 to about 1.0 mol/100 g of polymer, more preferably from about 0.05 to about 0.8 mol/100 g of polymer and most preferably from about 0.1 to about 0.6 mol/100 g of polymer. Suitable polymers are for example but not limited to polyurethane derivatives which contain ethylenically unsaturated double bonds, such as polyurethane acrylates.

Besides the polymer, the radiation-curable coating composition may also contain a different compound having a molecular weight of less than about 800 g/mol and capable of polymerization by cationic or free-radical pathways. These compounds have generally at least one ethylenically unsaturated double bond and/or one epoxy group and a molecular weight being less than about 800 g/mol. Such compounds generally serve to adjust to the desired working consistency of the radiation-curable preparations. This is particularly important if the preparation contains no other diluents, such as water and/or inert organic solvents, or contains these only to a subordinate extent. Such compounds are therefore also termed reactive diluents. The proportion of reactive diluents, based on the total amount of polymer and the reactive diluent in the radiation-curable preparation, is preferably in the range of about 0% to about 90% by weight, and most preferably in the range from about 5% to about 50% by weight.

Preferred reactive diluents are the esterification products of di- or polyhydric alcohols with acrylic and/or methacrylic acid. Such compounds are generally termed polyacrylates or polyether acrylates. Hexanediol diacrylate, tripropylene glycol diacrylate and trimethylolpropane triacrylate are particularly preferred.

The radiation-curable coating compositions may also comprise polymers which have cationically polymerizable groups, in particular epoxy groups. These include copolymers of ethylenically unsaturated monomers, the copolymers containing, as comonomers, ethylenically unsaturated glycidyl ethers and/or glycidyl esters of ethylenically unsaturated carboxylic acids. They also include the glycidyl ethers of OH-group-containing polymers, such as OH-group-containing polyethers, polyesters, polyurethanes and novolacs. They include moreover the glycidyl esters of polymers containing carboxylic acid groups. If it is desired to have a cationically polymerizable component, the compositions may comprise, instead of or together with the cationically polymerizable polymers, a low-molecular-weight, cationically polymerizable compound, for example a di- or polyglycidyl ether of a low-molecular-weight di- or polyol or the di- or polyester of a low-molecular-weight di- or polycarboxylic acid.

The radiation-curable compositions comprise usual auxiliaries, such as thickeners, flow control agents, defoamers, UV stabilizers, emulsifiers, surface tension reducers and/or protective colloids. Suitable auxiliaries are well known to the person skilled in the coatings technology. Silicones, particularly polyether modified polydimethylsiloxane copolymers, may be used as surface additives to provide good substrate wetting and good anti-crater performance by reduction of surface tension of the coatings. Suitable stabilizers encompass typical UV absorbers, such as oxanilides, triazines, benzotriazoles (obtainable as Tinuvin™ grades from Ciba Geigy) and benzophenones. These may be used in combination with usual free-radical scavengers, for example sterically hindered amines, e.g. 2,2,6,6-tetramethylpiperidine and 2,6-di-tert-butylpiperidine (HALS compounds). Stabilizers are usually used in amounts of from about 0.1% to about 5.0% by weight and preferably from about 0.3% to about 2.5% by weight, based on the polymerizable components present in the preparation.

The processes of producing an ink-jet printed fiber cement product of the present invention further comprise the step of radiation curing the one or more layers of the applied radiation-curable second coating composition. Such radiation curing of the coating compositions may include curing by heat curing, dual-curing, UV curing, EB curing and other curing technologies within a thermoplastic or thermosetting system.

If curing is performed by UV radiation, the preparations to be used comprise at least one photoinitiator.

A distinction is to be made here between photoinitiators for free-radical curing mechanisms (polymerization of ethylenically unsaturated double bonds) and photoinitiators for cationic curing mechanisms (cationic polymerization of ethylenically unsaturated double bonds or polymerization of compounds containing epoxy groups). Photoinitiators are not needed for electron beam curable compositions.

Suitable photoinitiators for free-radical photopolymerization, i.e. polymerization of ethylenically unsaturated double bonds, are benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl benzoin ether, ethyl benzoin ether and butyl benzoin ether, benzil ketals, such as benzil dimethyl ketal, 2-methyl-1-[4-(methylthio)phenyl]-2-morpholinopropan-1-one, anthraquinone and its derivatives, such as .beta.-methylanthraquinone and tertbutylanthraquinone, acylphosphine oxides, such as 2,4,6-trimethylbenzoyldiphenylphosphine oxide, ethyl-2,4,6-trimethylbenzoylphenylphosphinate and bisacylphosphine oxides.

Suitable photoinitiators for cationic photopolymerization, i.e. the polymerization of vinyl compounds or compounds containing epoxy groups, are aryl diazonium salts, such as 4-methoxybenzenediazonium hexafluorophosphate, benzenediazonium tetrafluoroborate and toluenediazonium tetrafluoroarsenate, aryliodonium salts, such as diphenyliodonium hexafluoroarsenate, arylsulfonium salts, such as triphenylsulfonium hexafluorophosphate, benzene- and toluenesulfonium hexafluorophosphate and bis [4-diphenylsulfoniophenyl]sulfide bishexafluorophosphate, disulfones, such as diphenyl disulfone and phenyl-4-tolyl disulfone, diazodisulfones, imidotriflates, benzoin tosylates, isoquinolinium salts, such as N-ethoxyisoquinolinium hexafluorophosphate, phenylpyridinium salts, such as N-ethoxy-4-phenylpyridinium hexafluorophosphate, picolinium salts, such as N-ethoxy-2-picolinium hexafluorophosphate, ferrocenium salts, titanocenes and titanocenium salts.

The abovementioned photoinitiators are used, in amounts from about 0.05% to about 20% by weight, preferably from about 0.1% to about 10% by weight and in particular from about 0.1% to about 5% by weight, based on the polymerizable components of the radiation-curable composition.

The radiation-curable coating compositions are applied in a known manner, e.g. by spraying, trowelling, knife application, brushing, rolling or pouring onto the the fiber cement product. It is also conceivable that the preparation may be applied to the fiber cement product by hot-melt processes or by powder-coating processes. The radiation-curable composition is preferably applied by roller-coating. The radiation-curable composition is usually applied to obtain a dry thickness in the range from about 10 to about 100 μm, preferably from about 50 to about 80 μm. The application may take place either at room temperature or at elevated temperature, but preferably not above 100° C.

The radiation-curable coating composition may be cured by exposure to a UV radiation of wavelength generally from about 200 nm to about 600 nm. Suitable examples of UV sources are high and medium pressure mercury, iron, gallium or lead vapor lamps. Medium pressure mercury vapor lamps are particularly preferred, e.g. the CK or CK1 sources from the company IST (Institut für Strahlungstechnologie). The radiation dose usually sufficient for crosslinking is in the range from about 80 to about 3000 ml/cm2. Any solvent present, in particular water, is dried out before the curing in a separate drying step preceding curing, for example by heating to temperatures in the range from about 40° C. to about 80° C., or by exposure to IR radiation.

In case of electron beam curing, irradiation is performed with high-energy electrons (usually from 100 to 350 keV), by applying a high voltage to tungsten filaments inside a vacuum chamber), and the actual curing step takes place in an inert, oxygen-free atmosphere.

The radiation-curable second coating compositions as used in the products and processes of the present invention described herein are applied to at least part of the outer surface of a fiber cement product using a brush, blade, roller, sprayer (e.g., air-assisted or airless, electrostatic), vacuum coater, curtain coater, flood coater or any suitable device that promotes an even distribution of the paint formulation over the surface, even if the surface is damaged, worn, or cracked. The composition may be applied to provide a smooth surface, colored surface or textured surface. A portion or an entire surface of the substrate may be coated at one time. In addition or as an alternative, all or a portion of the surface may be coated more than one time to achieve the desired thickness, gloss, and/or surface effect. The amount of coverage obtained by a quantity of the paint composition will vary depending on the desire and/or condition of the surface to be covered and the thickness of the coating applied.

In a fourth aspect, the present invention provides ink-jet printed fiber cement products obtainable by the processes as described above, which ink-jet printed fiber cement product at least comprise on at least part of their outer surface:

one or more cured layers of a first coating composition, at least comprising a binder and a pigment, wherein said first coating composition is characterized by a pigment volume concentration of higher than about 40%, and a dried ink print applied on top of said one or more cured layers of a first coating composition.

In particular embodiments, by using the methods as described above, these fiber cement products may further comprise one or more radiation-cured layers of a second coating composition applied on top of said one or more cured layers of a first coating composition and/or on top of said dried ink print.

In a fifth aspect, the present invention provides uses of a fiber cement products according to the present invention or uses of ink-jet printed fiber cement products according to the present invention as a building material. These fiber cement building materials may be porous materials comprising one or more different materials such as a gypsum composite, cement composite, geopolymer composite or other composites having an inorganic binder. The surface of the material may be sanded, machined, extruded, molded or otherwise formed into any desired shape by various processes known in the art. The fiber cement building materials may be fully cured, partially cured or in the uncured "green" state. Fiber cement building materials may further include gypsum board, fiber cement board, fiber cement board reinforced by a mesh or continuous fibers, gypsum board reinforced by short fibers, a mesh or continuous fibers, inorganic bonded wood and fiber composite materials, geopolymer bonded wood and fiber boards, concrete roofing tile material, and fiber-plastic composite material.

In particular embodiments, the fiber cement products of the invention are fiber cement sheets produced by the processes of the present invention and can be used to provide an outer surface to walls, both internal as well as external a building or construction, e.g. as façade plate, siding, etc.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Example 1: Production of Fiber Cement sheets According to the Processes of the Invention Fiber cement sheets were produced according to a conventional Hatschek process and cured thereafter.

The sheets were subsequently coated with a first coating, namely a water-based acrylic coating containing a white titandioxide pigment, having a composition as listed in Table 1 below. The pigment volume concentration of this coating composition was about 62%.

The coating was cured by drying.

TABLE 1

|  | % | type |
| --- | --- | --- |
| Pigment | 37.45 | Titan dioxid |
| Binder | 22.82 | per Acrylic |
| Additives | 2.18 | — |
| Filler/Extender | no | no |
| solvents (incl. Water) | 37.55 | — |
| Sum | 100.00 |  |

After drying, the coated surface of the sheets was subjected to inkjet printing with oil-based inks comprising calcinated inorganic pigments (Esmalglass-Itaca; yellow (CIK-AM 5118); orange-brown (CIK-MA 5115) and blue (CIK-AZ 1114)). The ink prints were allowed to air-dry.

Finally, the printed surface of the sheets was coated with an UV curable coating and UV cured.

The observed ink print pattern on all printed sheets was very clear and of high printing quality, i.e. no ink bleeding, no jagged edges and no ink stains were detected.

Finally, the printed fiber cement sheets were subjected to a number of tests in order to characterize their physical and chemical properties.

First, the coated sheets were subjected to an adhesion test (DIN ISO 2409), whereby adhesive tape is pressed onto the coated surface. Thereafter the tape is quickly (and in one go) pulled off. It was observed, as presented in Table 2, that 0% of the coating could be pulled off by the tape.

Also, a cross-cut test was done (DIN ISO 2409), whereby a right-angle lattice pattern is cut into the coating, penetrating through to the substrate (i.e. surface of the fiber cement sheet). It was observed that the edges of the cut lattice pattern were completely smooth and none of the squares of the lattice were detached (classification GT 0; see Table 2)).

Furthermore, the sheets were tested under artificial weathering conditions (using a Xenon lamp) in accordance with DIN 53 387). After the test, the print design was evaluated visually and the gloss of the sheets was measured and both parameters were compared with non-exposed samples. It could be concluded that there were no color fadings and no visual gloss changes (Table 2).

Water penetration was also measured. No visual watermarks were observed (Table 2).

Chemical resistance of the coated fiber cement sheets against a number of different chemicals was measured in accordance with DIN EN 2812-4:2007-5. The sheets were resistant against near all chemicals tested.

Finally, the wet rub resistance test was performed in accordance with DIN EN ISO 11998, which resulted in a loss of thickness of the sheets of about 6.5 μm (classification 2: scrubable). Based on the above results, it can generally be concluded that the fiber cement products of the present invention are particularly well suited for being subjected to inkjet printing, unlike the prior art fiber cement products up to now. This is due to the fact that the inventors have found that applying a coating composition having a pigment volume concentration of higher than 40% increases both the uniformity and the porosity of the outer surface of such products significantly so as to allow quick absorbance and capturing of the ink drops applied during inkjet printing. Undesired ink stains, ink bleeding and jagged edges of the ink pattern are hereby prevented and instead an optimal printing quality is obtained.

TABLE 2

| Tested property | Norm test | Specified critical values | Results |
| --- | --- | --- | --- |
| Adhesion: Tape test Crosscut test | DIN EN ISO 2409 | Tape test: <15% damage; Crosscut test: <GT3 | Tape test: 0% damage Crosscut test: GT 0 |
| Artificial weathering (Xenon) | DIN 53 387 | Print design was evaluated visually and the gloss was measured (both parameters were compared to a non exposed sample) | No color fading even after 4000 h → OK No visual gloss changes either. Measured Angles: 60°/85° Values before: 26.3/30.4 Values after: 24.1/28.5 → OK |
| Coverage of the TC | Water penetration | No watermarks | → OK |
| Chemical resistance | DIN EN 2812-4: 2007-5 | — | Resistant against nearly all tested chemicals |
| Wet rub resistance | DIN EN ISO 11998 | — | Loss of thickness 6.5 μm Class 2: "Scrubable" |

The invention claimed is:

1. A combination of a fiber cement product configured for inkjet-printing with solvent-based or water-based ink and comprising water, fiber and cement, and on at least part of an outer surface thereof, one or more cured layers of a first coating composition at least comprising a binder and a prime pigment capable of providing whiteness and/or color to the fiber cement product while contributing to concealment of the fiber cement product, wherein said first coating composition comprises an effective pigment volume concentration of at least 65% calculated from the following formula:

effective pigment volume concentration=volume of prime pigment/(volume of prime pigment and solid binder)×100.

2. Fiber cement product according to claim 1, wherein said first coating composition comprises an effective pigment volume concentration of between 65% and 80%.

3. Fiber cement product according to claim 1, wherein said pigment in said first coating composition is a white pigment.

4. Fiber cement product according to claim 1, wherein said binder is an acrylic polymer.

5. Fiber cement product according to claim 4, wherein said acrylic polymer is selected from the group consisting of styrene acrylic, siloxane acrylic, epoxy acrylic, polyester acrylic, polyuria acrylic and urethane acrylic and mixtures thereof.

6. Process for producing a fiber cement product as defined in claim 1, said process comprising:

providing a fiber cement product, applying to at least part of the outer surface of said fiber cement one or more layers of a first coating composition comprising a binder and a pigment, wherein said first coating composition comprises an effective pigment volume concentration of at least 65%, and curing said one or more layers of said first coating composition to obtain a fiber cement product configured for inkjet-printing with a solvent-based or water-based ink.

7. Process according to claim 6, wherein said first coating composition comprises an effective pigment volume concentration of between 65% and 80%.

8. Process according to claim 6, wherein said binder is an acrylic polymer.

9. Process according to claim 8, wherein said acrylic polymer is selected from the group consisting of styrene acrylic, siloxane acrylic, epoxy acrylic, polyester acrylic, polyuria acrylic and urethane acrylic and mixtures thereof.

10. Process for producing an ink-jet printed fiber cement product, said process comprising:

providing a fiber cement product obtained by the process as defined in claim 6, applying a solvent-based or water-based ink print on top of said one or more cured layers of said first coating composition by an inkjet-printer, and drying said solvent-based or water-based ink print, to obtain an ink-jet printed fiber cement product.

11. Process according to claim 10, wherein said solvent-based or water-based ink print is formed by using an ink comprising at least one inorganic pigment.

12. Process according to claim 10, further comprising:

applying one or more layers of a radiation-curable second coating composition on top of said one or more cured layers of a first coating composition and/or on top of said dried solvent-based or water-based ink print, and radiation curing said one or more layers of a radiation-curable second coating composition.

13. Ink-jet printed fiber cement product obtained by the process as defined in claim 10, which ink-jet printed fiber cement product comprises on at least part of its outer surface:

one or more cured layers of a first coating composition, comprising a binder and a pigment, wherein said first coating composition comprises an effective pigment volume concentration of at least 65%, and a dried solvent-based or water-based ink print applied on top of said one or more cured layers of a first coating composition.

14. Ink-jet printed fiber cement product according to claim 13, wherein said solvent-based or water-based ink print is formed by using an ink comprising at least one inorganic pigment.

15. Ink-jet printed fiber cement product according to claim 13, further comprising one or more radiation-cured layers of a second coating composition applied on top of said one or more cured layers of a first coating composition and/or on top of said dried solvent-based or water-based ink print.

16. The combination of claim 1, additionally comprising a solvent-based or water-based ink.

17. The combination of claim 16, wherein solvent in the solvent-based ink or co-solvent in the water-based ink is selected from at least one of ethanol, ethyl acetate, ethylene glycol, glycol esters, hexane, isopropanol, methanol, methyl ethyl ketone, mineral spirits, naphthas, normal propyl acetate, normal propyl alcohol, toluene and xylene.

* * * * *